US008116912B2

(12) United States Patent
Chao et al.

(10) Patent No.: US 8,116,912 B2
(45) Date of Patent: Feb. 14, 2012

(54) CONTROL DEVICE AND CONTROL METHOD OF TEMPERATURE CONTROLLER

(75) Inventors: Tzu Yi Chao, Hsin-Chu (TW); Hsin Chia Chen, Hsin-Chu (TW); Tzung Min Su, Hsin-Chu (TW); Chih Hung Lu, Hsin-Chu (TW); Cheng Kuang Sun, Hsin-Chu (TW); Cho Yi Lin, Hsin-Chu (TW)

(73) Assignee: Pixart Imaging Inc., Hsin-chu (TW)

( * ) Notice: Subject to any disclaimer, the term of this patent is extended or adjusted under 35 U.S.C. 154(b) by 214 days.

(21) Appl. No.: 12/496,383

(22) Filed: Jul. 1, 2009

(65) Prior Publication Data

US 2010/0100255 A1    Apr. 22, 2010

(30) Foreign Application Priority Data

Oct. 21, 2008   (TW) ................ 97140262 A

(51) Int. Cl.
    *G05D 23/00*    (2006.01)
(52) U.S. Cl. ........................ 700/276; 382/106
(58) Field of Classification Search .............. 700/275, 700/276, 277, 278, 299, 300; 382/106; 340/4.3
    See application file for complete search history.

(56) References Cited

U.S. PATENT DOCUMENTS

| | | | | |
|---|---|---|---|---|
| 5,180,333 A * | 1/1993 | Shyu | ................. | 236/49.3 |
| 5,839,654 A * | 11/1998 | Weber | ................. | 236/51 |
| 7,084,774 B2 * | 8/2006 | Martinez | ............... | 700/300 |
| 7,272,945 B2 * | 9/2007 | Bash et al. | ............... | 165/247 |
| 7,783,382 B2 * | 8/2010 | Huang et al. | .............. | 700/245 |
| 7,860,612 B2 * | 12/2010 | Huang et al. | .............. | 700/245 |
| 2005/0103876 A1 * | 5/2005 | Martinez | ............... | 236/94 |
| 2005/0187664 A1 * | 8/2005 | Bash et al. | ............... | 700/276 |
| 2009/0210193 A1 * | 8/2009 | Nagase | ............... | 700/276 |

FOREIGN PATENT DOCUMENTS

| | | |
|---|---|---|
| CN | 101493246 | 7/2009 |
| JP | 10-259942 A | 9/1998 |
| JP | 2001355898 | 12/2001 |
| TW | 172101 | 11/1991 |
| TW | M340479 | 9/2008 |

* cited by examiner

*Primary Examiner* — Charles Kasenge
(74) *Attorney, Agent, or Firm* — Lowe, Hauptman, Ham & Berner, LLP

(57) ABSTRACT

A control device of a temperature controller, for adjusting the temperature of an environment having at least one active object, includes a first image sensor, a second image sensor, a process unit and a control unit. The first image sensor is for capturing a first image containing the image of the active object. The second image sensor is for capturing a second image containing the image of the active object. The process unit calculates a distance between the active object and the temperature controller according to the first and second images. The control unit controls an operational status of the temperature controller according to the distance calculated by the process unit. The present invention further provides a control method of a temperature controller.

11 Claims, 5 Drawing Sheets

CONTROL DEVICE AND CONTROL METHOD OF TEMPERATURE CONTROLLER

CROSS REFERENCE TO RELATED APPLICATION

This application claims the priority benefit of Taiwan Patent Application Serial Number 097140262, filed on Oct. 21, 2008, the full disclosure of which is incorporated herein by reference.

BACKGROUND

1. Field of the Invention

This invention generally relates to a control device and a control method of home electronics and, more particularly, to a control device and a control method of a temperature controller.

2. Description of the Related Art

Conventional air conditioners use a temperature sensor to sense an indoor temperature so as to accordingly adjust the wind strength of the air conditioner and the indoor temperature. However, because the temperature sensor is generally installed at a fixed position, e.g. inside the air conditioner, the temperature sensed by the temperature sensor is generally not able to reflect an actual temperature variation instantly. Therefore, the temperature adjusting efficiency will be degraded and the machine will consume much more power. In addition, because the wind direction of conventional air conditioners can not be adjusted according to the position of people, it is difficult to adjust the indoor temperature to a comfortable condition.

Therefore, the industry proposed a method for controlling an air conditioner according to infrared images captured by an infrared image sensor. For example, Japanese Patent Publication No. 10-259942 discloses "A control device of an air conditioner" which includes an infrared image sensor, a status determining circuit and a control circuit. The infrared image sensor is for photographing the interior of a room. The status determining circuit determines the number, position, action, movement or the amount of clothes of people in the room based on the images captured by the infrared image sensor. The control circuit controls an operational status, e.g. the wind direction and wind strength, of the air conditioner according to a determined result of the status determining circuit.

However, the control device mentioned above determines a status mainly based on the images captured by one infrared image sensor, but in this way the control device is not able to perform corresponding control according to a distance between human bodies and the air conditioner. Therefore, the present invention provides a control device and a control method of a temperature controller which calculates the distance between at least one active object and a temperature controller according to a disparity map so as to control the output power of the temperature controller, wherein when the active object is far from the temperature controller, the output power of the temperature controller is increased; on the contrary, when the active object is near to the temperature controller, the output power of the temperature controller is decreased. In this manner, the indoor temperature can be adjusted effectively and the consumption power of the temperature controller can be reduced.

SUMMARY

The present invention provides a control device and a control method of a temperature controller, wherein the control device and the control method adjust the wind strength and/or wind direction of the temperature controller according to a distance between at least one active object and the temperature controller so as to effectively adjust the indoor temperature and reduce the consumption power of the temperature controller.

The present invention provides a control method of a temperature controller which is for adjusting the temperature of an environment having at least one active object. The control method includes the steps of: capturing a first image containing the image of the active object with a first image sensor; capturing a second image containing the image of the active object with a second image sensor; obtaining a disparity map according to the first and second images; calculating a distance between the active object and the temperature controller according to the disparity map; and adjusting an operational status of the temperature controller according to the distance.

In the control method of a temperature controller according to one embodiment of the present invention, when the number of the active object is more than one, the distance may be, for example, an average distance, a nearest distance and a longest distance between the plurality of the active objects and the temperature controller.

According to another aspect of the present invention, the present invention further provides a control device of a temperature controller which is for adjusting the temperature of an environment having at least one active object. The control device includes a first image sensor, a second image sensor, a process unit, a control unit and a transmission interface unit. The first image sensor is for capturing a first image containing the image of the active object. The second image sensor is for capturing a second image containing the image of the active object. The process unit calculates a distance between the active object and the temperature controller according to the first and second images. The control unit generates a control signal according to the distance calculated by the process unit. The transmission interface unit is for transmitting the control signal generated by the control unit to the temperature controller so as to accordingly control an operational status of the temperature controller.

According to another aspect of the present invention, the present invention further provides a control method of a temperature controller which is for adjusting the temperature of an environment having at least one active object. The control method includes the steps of: capturing a first image containing the image of the active object with a first image sensor; capturing a second image containing the image of the active object with a second image sensor; obtaining a disparity map according to the first and second images; obtaining a static parameter and a dynamic parameter according to the disparity map; and adjusting an operational status of the temperature controller according to the static parameter and the dynamic parameter.

The temperature controller of the present invention may be, for example, an air conditioner or a fan. In the present invention, when the distance between the active object and the temperature controller is changed, the wind strength and/or wind direction of the temperature controller will be adjusted accordingly so to overcome the problem of the uneasy control of the temperature existed in conventional devices. In addition, the disparity map obtained in the present invention can also be used for obtaining static parameters, e.g. the number of the active object and a relative position between the active object and the temperature controller, and dynamic parameters, e.g. the action, motion range and movement of the active object, so as to optimize adjustment of the indoor temperature.

BRIEF DESCRIPTION OF THE DRAWINGS

Other objects, advantages, and novel features of the present invention will become more apparent from the following detailed description when taken in conjunction with the accompanying drawings.

DETAILED DESCRIPTION OF THE EMBODIMENT

Figure 1:
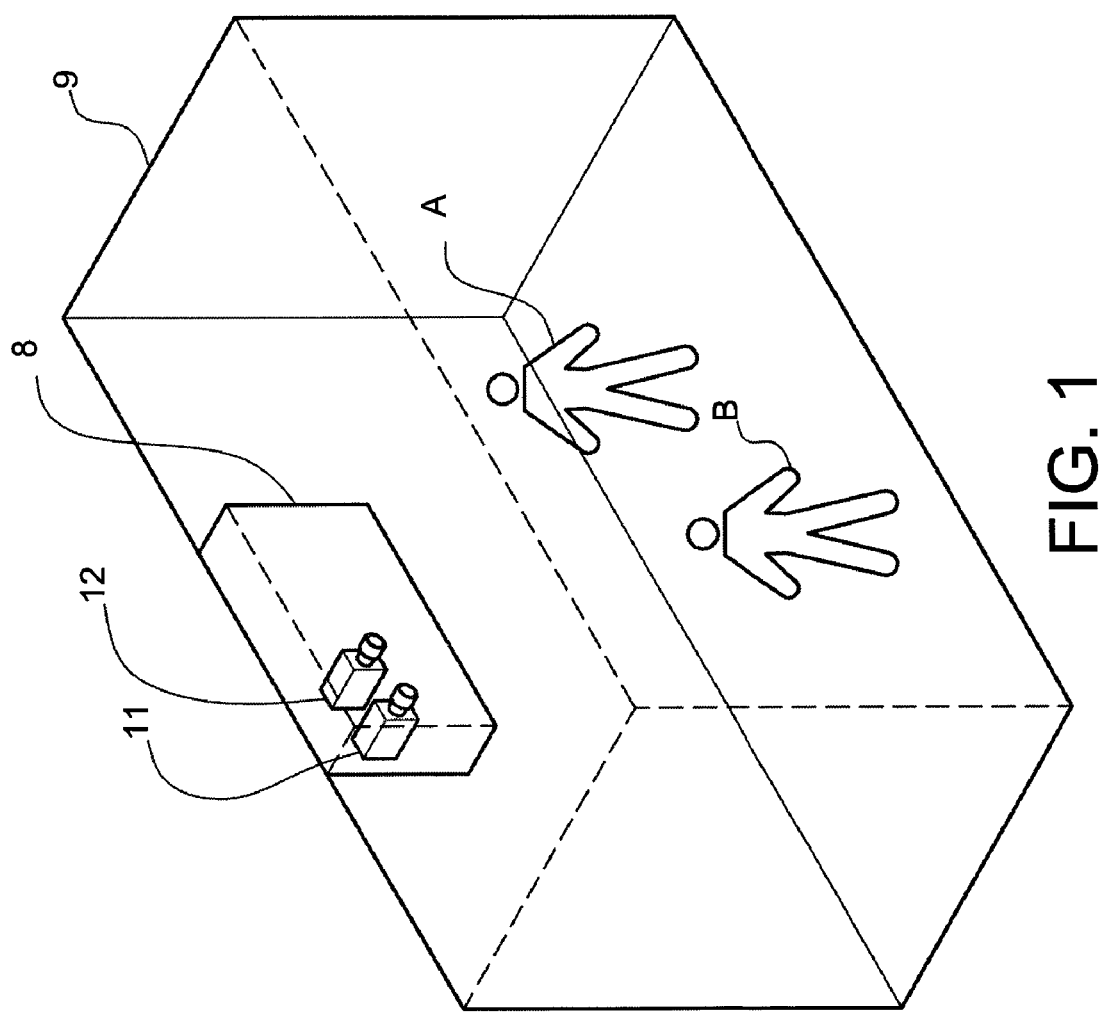
FIG. 1 shows a schematic diagram of the use of the temperature controller according to one embodiment of the present invention.

Please refer to FIG. 1, it shows a schematic diagram of the use of the temperature controller 8 according to one embodiment of the present invention. In this embodiment, the temperature controller 8 is shown as an air conditioner, but the present invention is not limited to this embodiment. Other embodiment of the temperature controller 8 includes, for example, a fan. The temperature controller 8 is for adjusting the temperature of an environment having at least one active object, wherein the active object may be a human body or an animal. For example, in one embodiment as shown in FIG. 1, the temperature controller 8 is installed in an indoor space 9 for adjusting the environment temperature of the indoor space 9, but the present invention is not limited to this embodiment. For example, if the temperature controller 8 is a fan, it may be operated outdoor.

Figure 2:
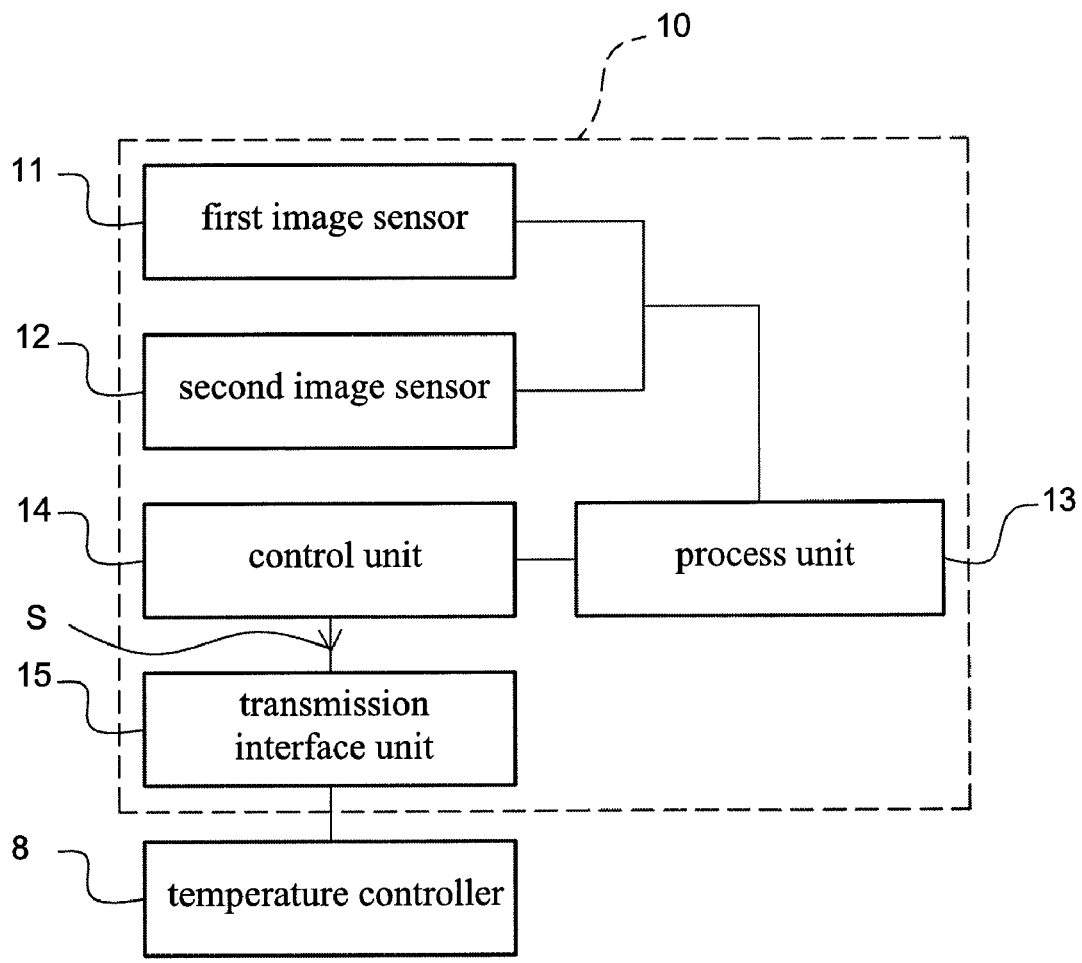
FIG. 2 shows a block diagram of the control device of a temperature controller according to one embodiment of the present invention.

Please refer to FIGS. 1 and 2, the temperature controller 8 is coupled to a control device 10 (the control device 10 may be disposed either inside or outside the temperature controller 8). The control device 10 includes a first image sensor 11 and a second image sensor 12 for capturing images of the active object in the indoor space 9. For example, in this embodiment, there are two active objects "A" and "B" in the indoor space 9, and the active object "A" is closer to the temperature controller 8 than the active object "B" is. In this embodiment, the control device 10 can obtain a disparity map according to the images captured by the first image sensor 11 and the second image sensor 12, and then obtain the distance from each active object in the indoor space 9 to the temperature controller 8. The distance may be, for example, an average distance between the active objects "A", "B" and the temperature controller 8, a nearest distance (the distance between the active object "A" and the temperature controller 8), and a longest distance (the distance between the active object "B" and the temperature controller 8). The control device 10 also adjusts an operational status, e.g. the wind strength and/or wind direction, of the temperature controller 8 according to the obtained distance. In addition, it is able to obtain static parameters, e.g. the position of each active object and the number of the active object, and dynamic parameters, e.g. the movement and motion range of each active object, by using the disparity map. The control device 10 may control the operational status of the temperature controller 8 according to one of or a combination of the static parameters and the dynamic parameters.

Please refer to FIG. 2 again, it shows a block diagram of the control device 10 of a temperature controller according to one embodiment of the present invention. The control device 10 includes a first image sensor 11, a second image sensor 12, a process unit 13, a control unit 14 and a transmission interface unit 15. Embodiments of the first image sensor 11 and the second image sensor 12 include a charge-coupled device (CCD) image sensor and a complementary metal-oxide semiconductor (CMOS) image sensor, and the first image sensor 11 and the second image sensor 12 are for capturing images containing the image of at least one active object. For example, in the embodiment of the present invention, the first image sensor 11 and the second image sensor 12 capture images of the indoor space 9 where the temperature controller 8 is installed. There is a transverse distance between the first image sensor 11 and the second image sensor 12. The process unit 13 is coupled to the first image sensor 11 and the second image sensor 12 for calculating a disparity map according to the images captured by the first image sensor 11 and the second image sensor 12 (the calculation process will be described in the following paragraphs), and for calculating a distance between each active object in the indoor space 9 and the temperature controller 8 and for calculating other parameters, such as the position, action, number, motion range and movement of each active object. The control unit 14 is coupled to the process unit 13 and generates a control signal "S" according to a result obtained by the process unit 13 so as to control an operational status, for example, but not limited to, the wind strength and/or wind direction, of the temperature controller 8. The transmission interface unit 15 is coupled to the control unit 14 for transmitting the control signal "S" to the temperature controller 8 so as to perform corresponding control.

Figure 3:
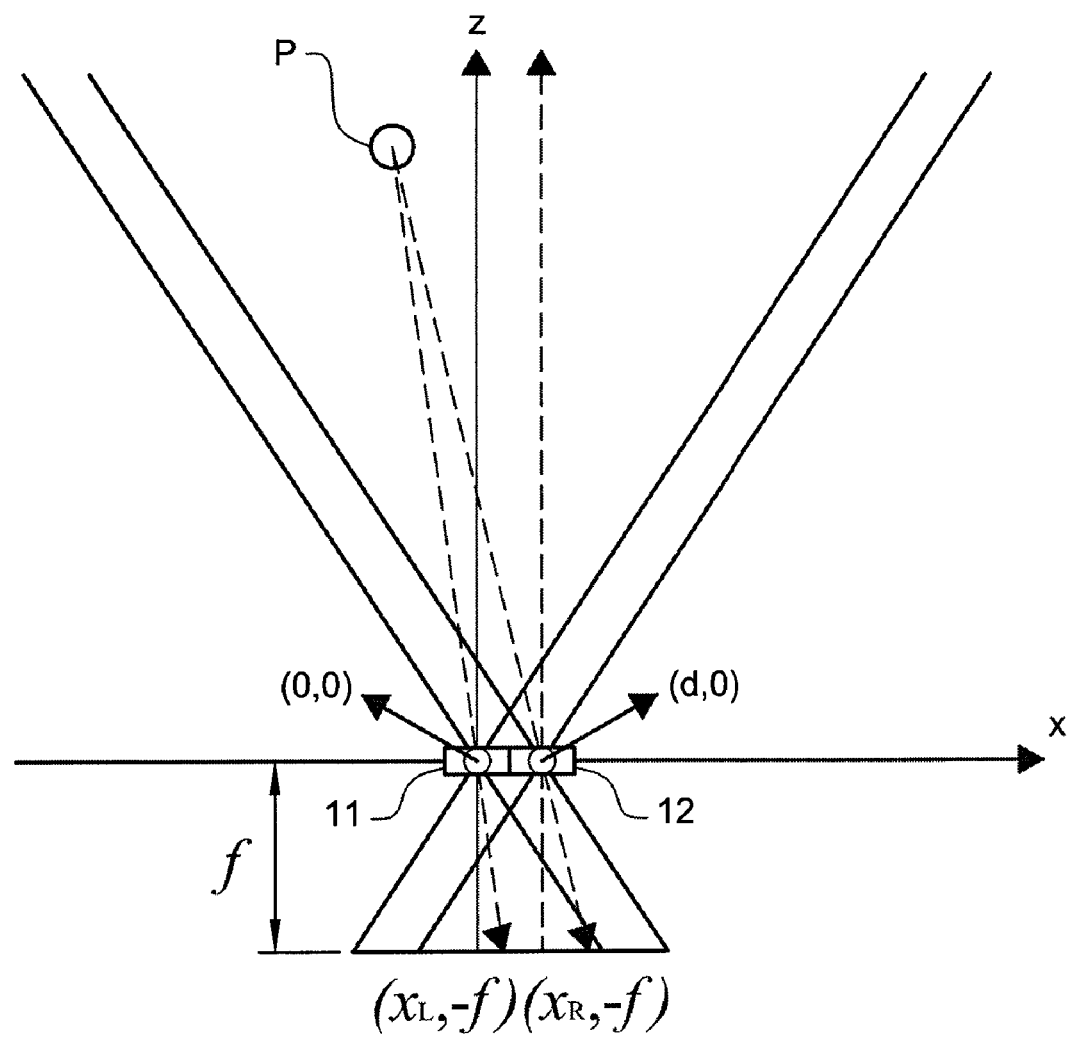
FIG. 3 shows a schematic diagram of the calculation of a disparity map in the control method of a temperature controller according to one embodiment of the present invention.

Please refer to FIG. 3, it shows a method for calculating the disparity map according to one embodiment of the present invention, wherein it is assumed that the transverse distance between the first image sensor 11 and the second image sensor 12 is "d"; the line that the first image sensor 11 and the second image sensor 12 located is x-axis; and there is a z-axis perpendicular to the x-axis. The first image sensor 11 is assumed to be located at the intersection of the x-axis and the z-axis, and the intersection herein is assumed to be the original point (0, 0); thus, the coordinate of the second image sensor 12 is (d, 0). In this embodiment, the first image sensor 11 and the second image sensor 12 respectively capture the image of a point "P" in the space formed by the x-axis and the z-axis, and it is assumed herein that the focal distance of the first image sensor 11 and the second image sensor 12 is "f". Thus, the image coordinate of the point "P" is ($x_L$, −f) in the image captured by the first image sensor 11 and is ($x_R$, −f) in the image captured by the second image sensor 12. Then, it is able to obtain two relational equations (1) and (2) as:

$$z/x = -f/x_L \quad (1)$$

$$z/(x-d) = -f/(x_R - d) \quad (2)$$

The position of the point "P" can be expressed as equations (3) and (4) by simply rewriting the equations (1) and (2).

$$x = d/(1-(x_R - d)/x_L) \quad (3)$$

$$z = f \times d/x_R - x_L - d) \quad (4)$$

The position of the point "P" relative to the first image sensor 11 and the second image sensor 12 could be obtained according to equation (3), and the distance of the point "P" from the first image sensor 11 and the second image sensor 12 could be obtained according to equation (4). It also can be understood from equation (4) that, when the value of $(x_R-x_L-d)$ becomes smaller, the distance of the point "P" from the first and second image sensors is longer, and $(x_R-x_L-d)$ is referred to disparity herein. One disparity value can be obtained according to each pixel in the sensing array (not shown) of the first image sensor 11 and the pixel at a corresponding position of the sensing array (not shown) of the second image sensor 12. The process unit 13 forms a 2-dimensional disparity map according to disparities obtained from all pixels in the sensing arrays of the first and second image sensors and accordingly identifies the distance of each active object from the temperature controller 8 according to the disparity map. In the obtained 2-dimensional disparity map, $(x_R-x_L-d)$ can be identified from the brightness. For example, when the brightness of the point "P" in the disparity map becomes higher, the value of $(x_R-x_L-d)$ becomes higher and the point "P" is closer to the first and second image sensors; on the contrary, when the brightness of the point "P" in the disparity map becomes lower, the value of $(x_R-x_L-d)$ becomes smaller and the point "P" is farther from the first and second image sensors. In this manner, a 2-dimensional image with different brightness levels can be obtained. The process unit 13 obtains static parameters, e.g. the position, number and distance of each active object, and dynamic parameters, e.g. the movement and motion region of each active object, according to the disparity map. For example, the movement can be obtained by calculating the correlation between two disparity maps. When the number of the active object is more than one, the distance between the active object and the temperature controller 8 may be, for example, an average distance, a nearest distance and a longest distance between the plurality of the active objects and the temperature controller 8, but the present invention is not limited to these embodiments. The control unit 14 generates a control signal according to one of or a combination of the static parameters and the dynamic parameters obtained by the process unit 13. The transmission interface unit 15 transmits the control signal to the temperature controller 8 so as to perform corresponding control.

Figure 4:
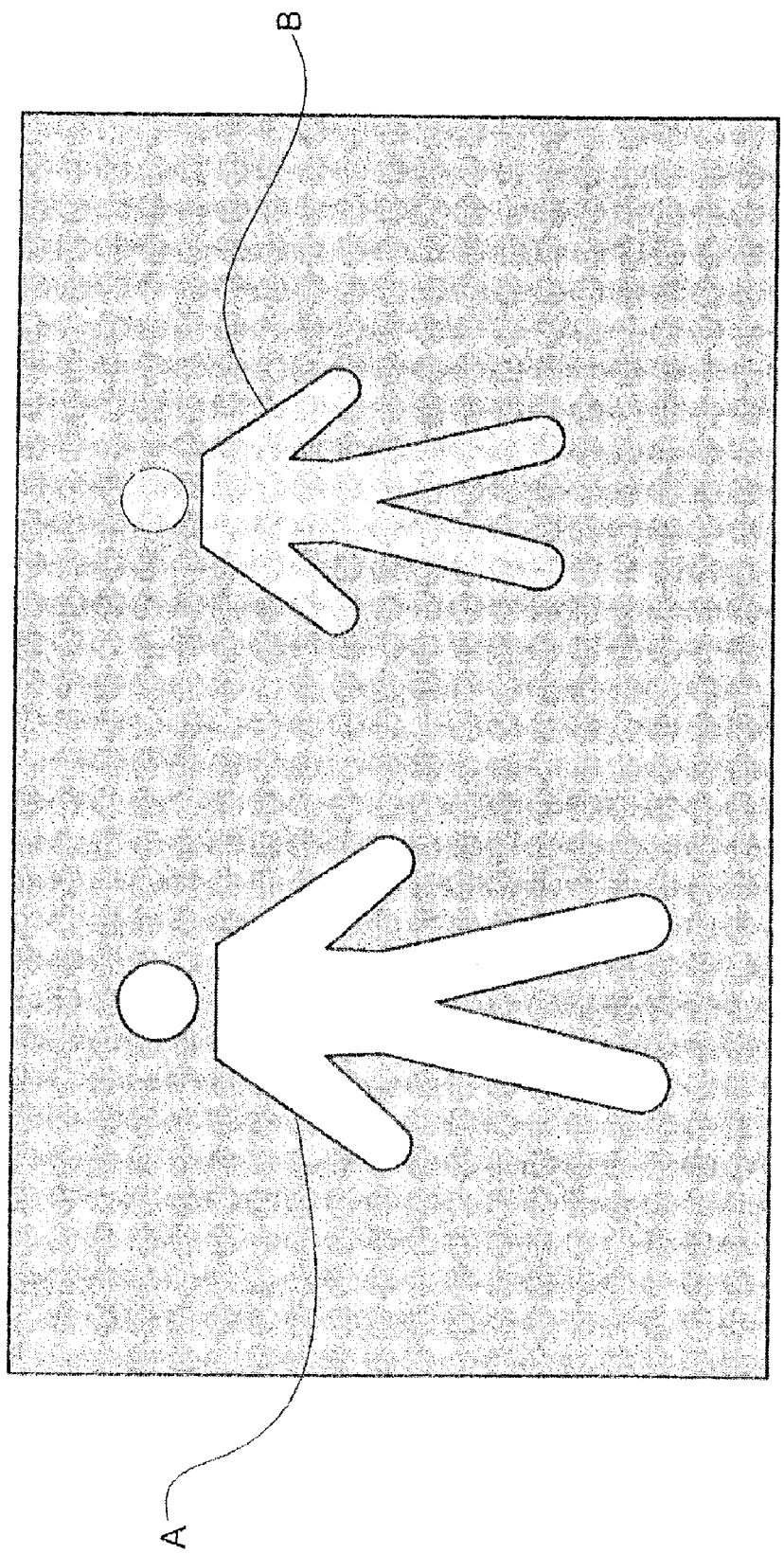
FIG. 4 shows an exemplary disparity map calculated by the control device of a temperature controller according to one embodiment of the present invention, wherein the brightness becomes higher when the active object is closer to the temperature controller.

Please refer to FIG. 4, it shows a 2-dimensional disparity map obtained from the images captured by the first image sensor 11 and the second image sensor 12 shown in FIG. 1, wherein because the active object "A" is closer to the temperature controller 8, it has the highest brightness (shown as white color); because the active object "B" is farther from the temperature controller 8, it has a lower brightness (shown as light gray color); and the environment image has the lowest brightness (shown as deep gray color). Because there may be a plurality of active objects in the indoor space 9, the control unit 14 determines the operational status of the temperature controller 8 according to the distribution of those active objects, such as their average distance, the nearest distance or the longest distance from the temperature controller 8.

Figure 5:
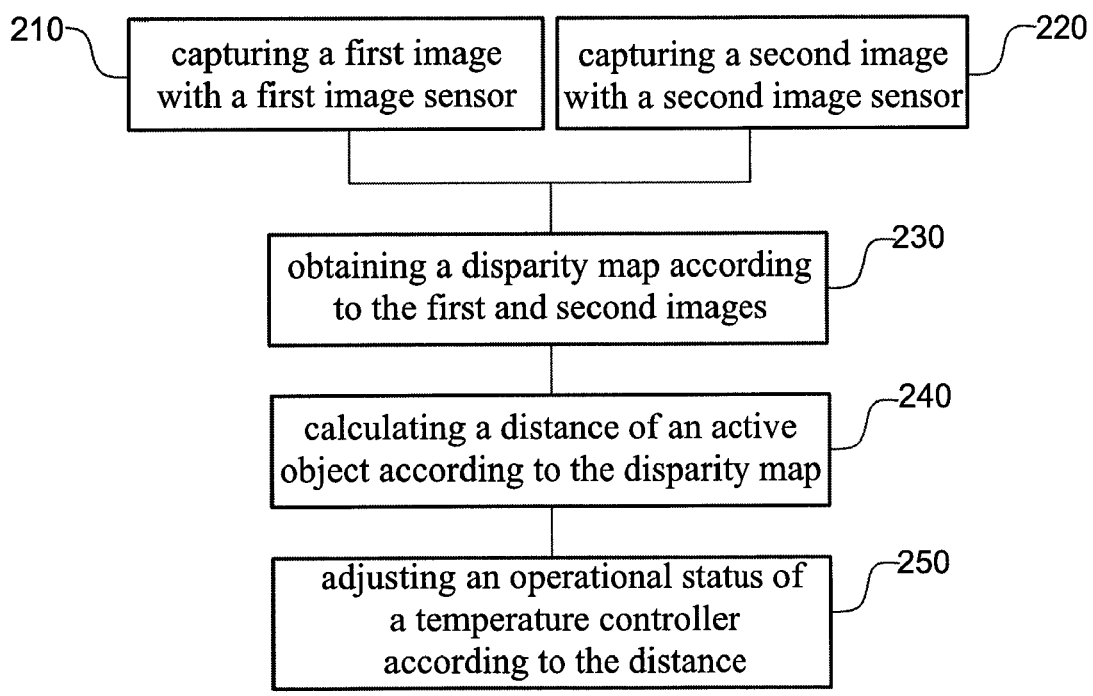
FIG. 5 shows a flow chart of the control method of a temperature controller according to one embodiment of the present invention.

Please refer to FIG. 5, it shows a flow chart of the control method of a temperature controller according to one embodiment of the present invention. The control method includes the steps of: capturing a first image with the first image sensor (step 210); capturing a second image with the second image sensor (step 220); obtaining a disparity map according to the first and second images (step 230); obtaining a distance of each active object from a temperature controller according to the disparity map (step 240); and determining an operational status of the temperature controller according to the distance.

Details of the control method are already described in the aforementioned paragraphs and therefore will not be repeated again.

As mentioned above, because conventional air conditioners capture images with only one infrared image sensor, it is not able to obtain the distance between the active object and the air conditioner in an indoor space. The present invention further provides a control device and a control method of a temperature controller (FIGS. 2 and 5) which obtains a disparity map according to the images captured by two image sensors and obtains the distance between each active object and the temperature controller and other static and dynamic parameters in an environment according to the disparity map so as to accordingly control the operational status of the temperature controller and to optimize adjustment of the environmental temperature.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A control method of a temperature controller, the temperature controller being for adjusting the temperature of an environment having at least one active object, the control method comprising the steps of:
    capturing a first image containing the image of the active object with a first image sensor;
    capturing a second image containing the image of the active object with a second image sensor;
    obtaining, using a process unit, a disparity map according to the first and second images;
    calculating, using the process unit, a distance between the active object and the temperature controller according to the disparity map; and
    adjusting, using a control unit, an operational status of the temperature controller according to the distance.

2. The control method as claimed in claim 1, wherein the operational status of the temperature controller is at least one of a wind strength and a wind direction of the temperature controller.

3. The control method as claimed in claim 1, wherein when the number of the active object is more than one, the distance is selected from the group consisting of an average distance, a nearest distance and a longest distance between the active objects and the temperature controller.

4. A control device of a temperature controller, the temperature controller being for adjusting the temperature of an environment having at least one active object, the control device comprising:
    a first image sensor, capturing a first image containing the image of the active object;
    a second image sensor, capturing a second image containing the image of the active object;
    a process unit, calculating a distance between the active object and the temperature controller according to a disparity map obtained according to the first and second images; and
    a control unit, controlling an operational status of the temperature controller according to the distance calculated by the process unit.

5. The control device as claimed in claim 4, wherein the temperature controller is an air conditioner or a fan.

6. The control device as claimed in claim 4, further comprising a transmission interface unit for transmitting a control signal generated by the control unit to the temperature controller so as to accordingly control the operational status thereof.

7. The control device as claimed in claim 4, wherein the first and second image sensors are a CCD image sensor or a CMOS image sensor.

8. A control method of a temperature controller, the temperature controller being for adjusting the temperature of an environment having at least one active object, the control method comprising the steps of:

capturing a first image containing the image of the active object with a first image sensor;

capturing a second image containing the image of the active object with a second image sensor;

obtaining, using a process unit, a disparity map according to the first and second images;

obtaining, using the process unit, a static parameter and a dynamic parameter according to the disparity map; and adjusting, using a control unit, an operational status of the temperature controller according to the static parameter and the dynamic parameter.

9. The control method as claimed in claim 8, wherein the static parameter is selected from a group consisting of a distance between the active object and the temperature controller, a position of the active object, the number of the active object and a combination thereof; the dynamic parameter is at least one of the movement of the active object and the motion range of the active object.

10. The control method as claimed in claim 9, wherein when the number of the active object is more than one, the distance is selected from a group consisting of an average distance, a nearest distance and a longest distance between the active objects and the temperature controller.

11. The control method as claimed in claim 8, wherein the operational status of the temperature controller is at least one of a wind strength and a wind direction of the temperature controller.

* * * * *